March 14, 1950
D. REITER
2,500,867
MATRIX RETAINER
Filed April 14, 1949
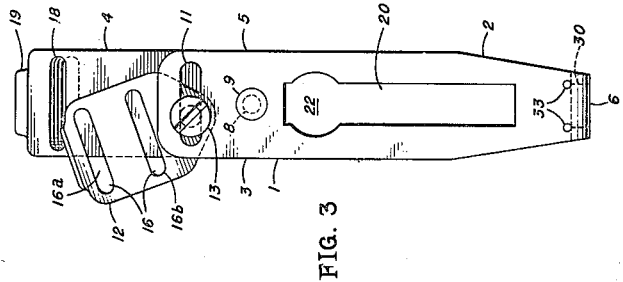
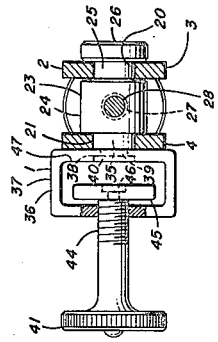
Inventor:
David Reiter
By George F. Vaias
his Attorney Patented Mar. 14, 1950

2,500,867

UNITED STATES PATENT OFFICE 2,500,867

MATRIX RETAINER

David Reiter, Woodside, N. Y.

Application April 14, 1949, Serial No. 87,527

7 Claims. (Cl. 32—63)

This invention pertains to a matrix band retainer particularly adaptable for use in the profession of the art of dentistry.

An object of the present invention is the provision of an improved retainer for holding a dental matrix band and pulling the band in such a manner that it will conform to any shape of tooth.

Another object of the present invention is the provision of an improved retainer whereby a dental matrix flexible band will have one end thereof held fixed to a movable part of a frame and another end of the dental matrix band can be pulled along a fixed path so that the dental matrix band will conform neatly to a tooth of any configuration.

The above and numerous other objects of the invention will become apparent from the succeeding description considered together with the accompanying drawing, wherein:

Figure 1 is an enlarged plan view of a matrix band retainer embodying the present invention.

Figure 2 is a side elevational view of the matrix band retainer illustrated in Figure 1.

Figure 3 is another and partial side elevational view of the matrix band retainer shown in Figure 1.

Figure 4 is a sectional view taken along the lines 4—4 of Figure 2, looking in the direction of the arrows.

Figure 5 is a sectional view taken along the lines 5—5 of Figure 1, looking in the direction of the arrows.

Referring now in detail to the various figures of the drawings wherein like reference characters indicate like parts, the numeral 1 is employed to designate, in a somewhat general manner, a dental matrix band retainer exemplifying a form of the present invention.

In the practice of dentistry it has been found that unless a matrix band is arranged to conform completely to a tooth about a location to be filled that the filling material, be it of wax or precious or semi-precious material, will upon being compressed within the cavity, be urged between the matrix band and tooth outwardly of the cavity. This undesirable condition wherein a matrix band has a portion thereof spaced from an outer surface of a tooth not only prevents a solid packing of the cavity but it also presents an outlet for the waste of material and does not afford a smooth, even, uninterrupted surface where the outer surface of the tooth meets the outer surface of the filling.

In order to eliminate the above noted undesirable condition there is provided, in the present structure, a holder or retainer 2 comprising a frame or housing 3 being formed preferably as a U-shaped member and having a relatively long leg 4 spaced a predetermined distance from and parallel with a relatively short leg 5. The legs of the housing are joined together adjacent one extremity thereof by means of a connecting web 6. Positioned intermediate the ends of the frame is a leg rigidifying means formed by a nipple 7 which is interposed between the legs and functions as a spacer and a rivet 8 or any other like means which bridges the legs and extends through the nipple. The ends of the rivet are formed as countersunk heads 9 so as to be within the confines of the legs and offer no outstanding obstructions.

A matrix band 10, hereinafter sometimes called band, is associated with the retainer so that, as previously stated, it may partially encompass a tooth which has previously been prepared for filling. Various shaped bands have heretofore been proposed to insure a close fit of the band to a particular shaped tooth, but the difficulty of providing or suggesting various shaped bands lies in the fact that many band shapes are necessary and even then, if an operator does not select the proper band, the latter will not fit snugly against a given tooth shape. This various or multiple shapes proposition becomes quite an expensive item because a dentist is required to carry a supply of the entire range of shapes. A following of the teachings of the present invention eliminates entirely the necessity of various or multiple band shapes and it is only necessary for a dentist to obtain a reel or ribbon of band, cut off a desired length and insert this section in the retainer as hereinafter set forth; the retainer being so arranged and constructed that the band will, when tensioned, follow the natural contour of the tooth, be the latter of the straight variety or of the bell-shaped type.

The short leg is provided with a transverse slot or opening 11 positioned adjacent the face extremity of the short leg. Positioned inwardly of the frame is an extension 12 which is removably secured to the short leg, inwardly thereof, by means of any attaching medium, such as the screw and nut arrangement 13. The shank 14 of the screw extends through the leg slot and affords various movements or adjustments of the extension. For example, the extension may be pivoted about the screw or the extension may be moved in opposite direction from the centrally illustrated position transversely of the short leg for the value of the slot length. These various adjustments permit the matrix band to be disposed at various angles so that the latter may conform to any given tooth configuration. One end 15 of the matrix band is interlocked with the frame extension and it is preferred to fix removably this band end to the extension. Toward the accomplishment of the latter the frame extension is provided with a plurality of transversely extending apertures 16 positioned adjacent to one another. The end 15 of the band is first threaded through the aperture 16a in a direction from the inside to the outside of the frame and then looped back to be threaded through the aperture 16b in a direction from the outside of the frames with the free end 15a of the band being interposed between the band and extension. This interlacing of the band will form a definite or fixed lock between the frame extension and band so as to hold firmly this one end of the band. With this arrangement the straight ribbon or band may be made to form a straight walled, cylindrical or frusto-conical design to thereby conform to any shaped tooth. A foot 17 of the frame extremity is tapered or inclined as indicated particularly in Figure 1 of the drawing and since the extension is outwardly of the tooth engaging loop 10a of the band this extension foot will bear against a tooth adjacent the one being treated.

Since the band end 15 is fixed, some drafting means must necessarily be associated with the retainer so that the band may be carefully and firmly or snugly drawn about a tooth to be treated. Toward the accomplishment of this feature the long leg of the frame is provided with a slot or elongated opening 18 which extends through the long leg at an oblique angle thereto. This slot 18 is positioned in the close proximity to a foot 19 of the long leg and this foot is also disposed at an angle to fit or bear against a tooth adjacent the one being treated. Preferably, the included angle between the feet 17 and 19 is in excess of 90 degrees and less than 180 degrees with the foot 19 being in advance of the foot 17 so that the retainer may be manipulated to extend outwardly of a mouth irrespective of the location of the tooth being treated. After forming the loop 10a in the band, the latter is threaded through the inclined slot 18 in a direction from within the retainer to a position outwardly thereof thus placing the long leg away from the tooth being treated and afford a neat fit of the band about a tooth.

The legs of the frame, at a location between the web and spacer thereof, are provided with aligned keyways or guideways 20 and 21; the former being positioned in the short leg and the latter being positioned in the long leg. At a location adjacent to the spacer, the keyways are enlarged as indicated at 22 in the drawing. Associated with the retainer is a block 23 having an intermediate portion or shoe 24 disposed between the legs. The shoe has, outstanding centrally therefrom a collar 25 fitting within and arranged to be moved along the short leg guideway and the collar terminates in a disc 26 positioned outwardly of the short leg. The disc is of such diameter so as to allow its free passage through the frame keyway enlargements 22 and the shoe 24 is also of such diameter as to allow it to be introduced to its illustrated position through the enlargement 22 of the long leg.

Power or force imparting means is associated with the block to control its movement longitudinally of the frame and as exemplary of such a means there is provided a screw stem 27 having a reduced extremity 28 extending through the shoe and riveted over as at 29 to thus unite the block and stem. The frame web has a centrally located opening 30. An actuating knob 31 has a reduced extremity 32 occupying the web opening and projecting into the frame for a predetermined distance. The legs have aligned holes therein in the proximity of the web for the accommodation of pins 33 which extend partially into a circular recess 34 of the knob reduced extremity to thereby interlock the knob with the frame and still permit a free rotary movement of the knob (see Figure 4). The screw stem extends into and is threadedly related with the knob so that any rotary motion of the knob will be reflected in a lineal motion of the block thereby moving the latter along the guideways.

The block has a centrally located projection 35 of slightly less diameter than the guideway 21 of the long leg through which it extends. Mounted on the block projection is a cage 36 formed by an open ended enclosure 37 which has a recess 38 formed therein. The last named recess neatly accommodates a pin 39 projecting axially from the block projection and the pin is upset to form a head 40. By this arrangement the cage and block are locked together to permit a rotary motion of the cage relative to the block. Associated with the cage is a band clamping device comprising a headed rotatable handle 41 being drilled axially thereof for the reception of a reduced rod 42 of a tie 43, see Figure 4. The handle is exteriorly threaded as at 44 and as it extends through a wall of the cage, the cage and handle are interlocked. The reduced rod of the tie is riveted over exteriorly of the handle and thus the two function as a unit. Disposed within the cage and particularly the open ended enclosure thereof is a presser foot 45 plate-like in formation and having a relief therein for the accommodation of a head 46 of the tie. Thus a rotary motion of the handle will move the presser foot toward or away from an opposed wall 47 of the cage. Accordingly an extremity 15b of the band, following a course along the outside of the long leg after it is passed through the slot 18, is threaded through the open ended cage enclosure to extend therebeyond. A proper manipulation of the handle will clamp the band between the presser foot and wall 47 and a proper manipulation of the knob 31 will draw the band extremity 15b in a direction away from the tooth to be treated and tighten the band loop 10a about the tooth to be treated. It is to be noted that since the cage which carries one end of the band, is pivotally mounted it will cooperate with the adjustably mounted short leg extension to insure the band closely following the contour of the tooth to be treated.

From the above it will be noted that various changes and alterations may be made to the illustrated and described construction without departing from the spirit of the invention and scope of the appended claims.

I claim:

1. In a dental matrix retainer, the combination of, a frame having a long leg and a short leg, an extension on said short leg pivotally and transversely movably mounted on said short leg, means interlocked with and slidable relative to said legs, clamping means carried by said first named means outwardly of said frame, a matrix band having one end interlocked with said extension, said matrix band extending through a slot in said long leg, and another end of said matrix band associated with said clamping means.

2. In a dental matrix retainer, the combination of, a frame having a long leg and a short leg, an extension removably secured to said short leg, said extension being pivotally and transversely movable, means between said legs and being slidably controlled, said means being guided along a fixed path longitudinally of said frame by said legs, clamping means carried by said first named means outwardly of said long leg, a matrix band, one end of said matrix band being held stationary by being interlocked with said extension, a slot in said long leg adjacent an extremity thereof for guidingly receiving said matrix band, and another end of said matrix band being associated with said clamping means.

3. In a dental matrix retainer, the combination of, a frame having spaced legs of different extent, an extension removably secured to one of said legs, said extension being pivotally and transversely movable relative to said frame, slidably controlled means between said legs and guided along a fixed path by said legs, retaining means carried by said slidably controlled means outwardly of said frame, a band, one extremity of said band passing through a plurality of openings in said extension for interlocking said band with said extension, an opening in the other of said legs to guidingly receive said band, and another extremity of said band being associated with said retaining means.

4. In a dental matrix retainer, the combination of, a frame having a short leg and a long leg extending in parallel spaced relation, an extension removably secured to said short leg adjacent an extremity thereof, said extension being pivotally mounted and arranged to be shifted transversely of said short leg, slidably controlled means between said legs and guided along a fixed path by said legs, clamping means carried by said slidably controlled means outwardly of said frame, a band, a plurality of closely positioned apertures in said extension, one end of said band being interwoven through said apertures for locking said end to said extension, a slot in said long leg adjacent an end thereof, said band extending through said slot, and another end of said band being held by said clamping means.

5. In a dental matrix retainer, the combination of, a frame having a short leg and a long leg arranged in spaced relation, an extension removably secured to said short leg adjacent an extremity thereof, said extension being arranged to be shifted transversely of said short leg so as to be out of alignment with said long leg, slidably controlled means between said legs and guided along a fixed path by said legs, clamping means carried by said first named means outwardly of said frame, a band, a plurality of closely positioned apertures in said extension, one end of said band being interwoven through said aperture for locking said end to said extension, a slot extending through said long leg at an oblique angle thereto for reception of said band, and another end of said band being held by said clamping means.

6. In a dental matrix retainer, the combination of, a frame having a long leg and a short leg, an extension on said short leg pivotally and transversely movably mounted on said short leg, means interlocked with and slidable relative to said legs, clamping means carried by said first named means outwardly of said frame, a matrix band having one end interlocked with said extension, said matrix band extending through a slot in said long leg, another end of said matrix band associated with said clamping means, and feet on said extension and long leg disposed at an angle to one another.

7. In a dental matrix retainer, the combination of, a frame having a long leg and a short leg, an extension member adjacent said short leg for lengthening the effective length thereof and being movably mounted with respect to said frame, a pivotally mounted clamping member positioned outwardly of said frame, a plurality of slots in said extension member, an opening extending through said long leg at an oblique angle thereto, a matrix band having one end interlaced with said extension member through said slots; said matrix band extending through said oblique opening and having another end thereof secured by said clamping member, and means slidably mounted within said frame and arranged to move one of said members so as to tighten said matrix band about a tooth.

DAVID REITER.

REFERENCES CITED

The following references are of record in the file of this patent:

UNITED STATES PATENTS

| Number | Name | Date |
|---|---|---|
| 2,126,308 | Butler | Aug. 9, 1938 |